US00RE36953E

United States Patent [19]

Lodwig et al.

[11] E Patent Number: Re. 36,953

[45] Reissued Date of Patent: Nov. 14, 2000

[54] COMPUTER DRIVEN PRINTER

[75] Inventors: Dean Howard Lodwig, West Hills; Philip Stuart Bryer, Tarzana; Douglas LeRoy Harb, Woodland Hills, all of Calif.

[73] Assignee: Eltron International, Inc., Camarillo, Calif.

[21] Appl. No.: 09/248,606

[22] Filed: Feb. 11, 1999

Related U.S. Patent Documents

Reissue of:

[64] Patent No.: 5,820,279
Issued: Oct. 13, 1998
Appl. No.: 08/532,083
Filed: Sep. 22, 1995

[51] Int. Cl.[7] ..... B41J 33/14

[52] U.S. Cl. ..... 400/234; 400/236

[58] Field of Search ..... 400/208, 234, 400/236, 236.1, 236.2, 613; 101/288

[56] References Cited

U.S. PATENT DOCUMENTS

| | | | |
|---|---|---|---|
| 4,812,063 | 3/1989 | Kunimitsu et al. | 400/234 |
| 5,032,032 | 7/1991 | Chu et al. | 400/234 |
| 5,143,461 | 9/1992 | Inoue et al. | 400/234 |
| 5,201,588 | 4/1993 | Sakai et al. | 400/613 |
| 5,297,879 | 3/1994 | Oikawa | 400/234 |
| 5,401,352 | 3/1995 | Matsushita | 101/288 |
| 5,411,342 | 5/1995 | Horie et al. | 400/613 |
| 5,529,410 | 6/1996 | Hunter et al. | 400/234 |
| 5,714,996 | 2/1998 | Hodai | 400/208 |

FOREIGN PATENT DOCUMENTS

| | | | |
|---|---|---|---|
| 64-084961 | 4/1988 | Japan | 400/234 |

*Primary Examiner*—Stephen R. Funk
*Attorney, Agent, or Firm*—Fulbright & Jaworski L.L.P.

[57] ABSTRACT

Apparatus for maintaining tension on a ribbon in a printer used for transferring an image, e.g., thermally, from a print head through the ribbon to a print medium. By maintaining ribbon tension and thus keeping the ribbon essentially without wrinkles, print quality is enhanced. This tension maintenance apparatus uses a pair of torqued reel subassemblies with the ribbon extending between and is of particular significance when used in conjunction with a label stock as a printer medium when the printer mechanism bidirectionally moves the label stock to assist removal of labels from its backing. These torqued reel assemblies are sufficiently loaded such that ribbon tension is maintained between these reel assemblies despite this bidirectional movement.

13 Claims, 12 Drawing Sheets

FIG. 12B
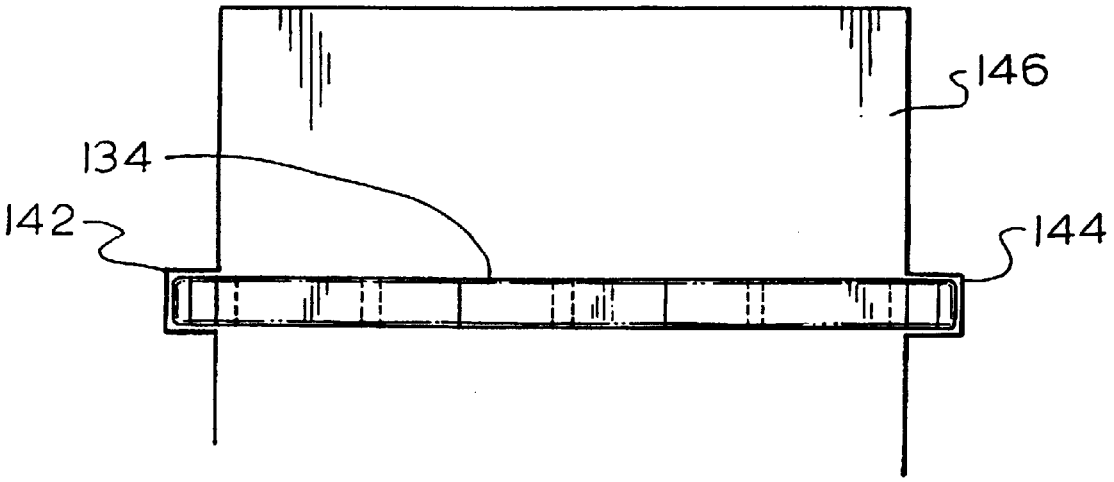
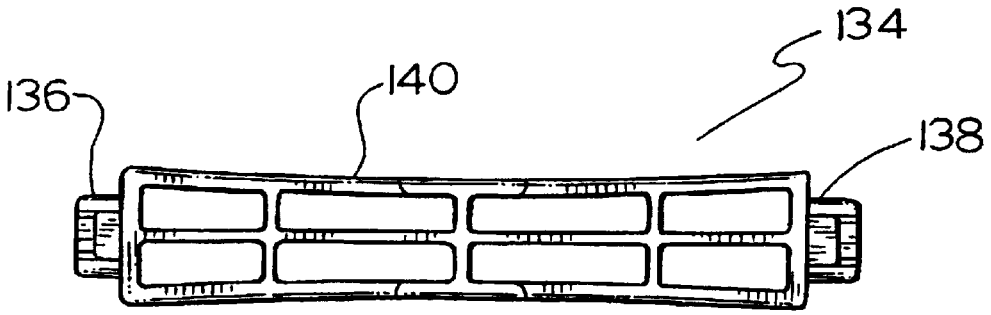
FIG. 12A

COMPUTER DRIVEN PRINTER

Matter enclosed in heavy brackets [ ] appears in the original patent but forms no part of this reissue specification; matter printed in italics indicates the additions made by reissue.

BACKGROUND OF THE INVENTION

The present invention relates generally to printers, e.g., computer-driven, which imprint patterns from a print head through a ribbon to a print medium, e.g., paper, and in particular to printers of the type which can utilize thermal transfer ribbons. Prior art printers suitable for printing bar code labels and the like are typically comprised of 1) a thermal print head, 2) a drive roller mounted opposite to the print head, 3) a print medium subsystem including a supply reel for guiding a print medium along a path extending between the print head and the drive roller, 4) a ribbon subsystem including a supply reel and a takeup reel for guiding a ribbon along a path extending between the print head and the print medium path, 5) a spring for urging the print head toward the drive roller to pinch the print medium and the ribbon therebetween and 6) a motor mechanism for causing the drive roller to move the print medium and the ribbon in either a forward or a reverse direction.

SUMMARY OF THE INVENTION

The present invention is directed to a printer apparatus particularly configured to maintain tension on a ribbon to prevent ribbon wrinkling regardless of the direction the ribbon is moved.

In accordance with the invention, torque accumulation devices are coupled to the ribbon supply and ribbon takeup reels to maintain the ribbon tension. More particularly, the ribbon takeup reel torque accumulation device is configured to drive the takeup reel (e.g., clockwise) when the print medium and ribbon are moved in a forward direction and the ribbon supply reel torque accumulation device is configured to drive the supply reel (e.g., counter-clockwise) when the print medium and ribbon are moved in a reverse direction. When the takeup reel is being driven, the supply reel produces a drag to maintain ribbon tension. When the supply reel is being driven, the takeup reel produces drag to maintain ribbon tension.

In a preferred embodiment, a drive motor coupled to a drive roller for moving the print medium and the ribbon is also coupled to the takeup reel torque accumulation device to accumulate torque, i.e., store energy. When the drive motor (via the drive roller) moves the print medium in a forward direction, it is this accumulated torque that urges rotation of the takeup reel. As the ribbon moves forward, the supply reel torque accumulation device accumulates torque which acts as a drag on supply reel. However, when the drive motor reverse direction, the accumulated torque in the supply reel accumulation device urges rotation of the supply reel that is resisted by the takeup reel accumulation device. These two opposing torques maintain the ribbon in tension, independent of its movement.

In accordance with a further aspect of the invention, a preferred printer facilitates loading of a print medium, e.g., paper, and a ribbon which both pass between a print head and platen. To facilitate loading, a preferred printer apparatus is formed using a clam shell housing comprised of two assemblies that are rotatably coupled at a first end and are latchable at a second end. The first assembly includes the platen and the second assembly includes the print head such that when the two assemblies are unlatched and rotated apart, feed paths for the print medium and the ribbon are accessible to an operator.

In accordance with a still further aspect of the invention, a preferred printer automatically centrally orients a roll of print medium, e.g., paper, before it passes an area between a print head and platen, i.e., a print surface. Such embodiments are preferably comprised of a non-rotatable axle which supports a roll of print medium wound around a hollow core. This axle has an upper concave surface which tends to automatically center the hollow core within the concave surface as print medium is withdrawn and thus automatically centers the print medium as it approaches the print surface.

The novel features of the invention are set forth with particularity in the appended claims. The invention will be best understood from the following description when read in conjunction with the accompanying drawings.

BRIEF DESCRIPTION OF THE DRAWINGS

FIGS. 12A and 12B show front and top views of a core axle used to automatically centrally align a roll of print medium as it enters the printer.

DESCRIPTION OF THE PREFERRED EMBODIMENTS

The present invention is directed to apparatus for maintaining tension on a ribbon in a printer, e.g., a computer driven printer, used for transferring an image, e.g., thermally, from a print head by selectively transferring material from the ribbon to a print medium, e.g., paper. By maintaining ribbon tension and thus keeping the ribbon (typically formed as an extremely thin web) essentially without wrinkles, print quality is enhanced. A tension maintenance apparatus in accordance with the invention preferably uses a pair of torqued reel assemblies having the ribbon extending between.

Figure 1:
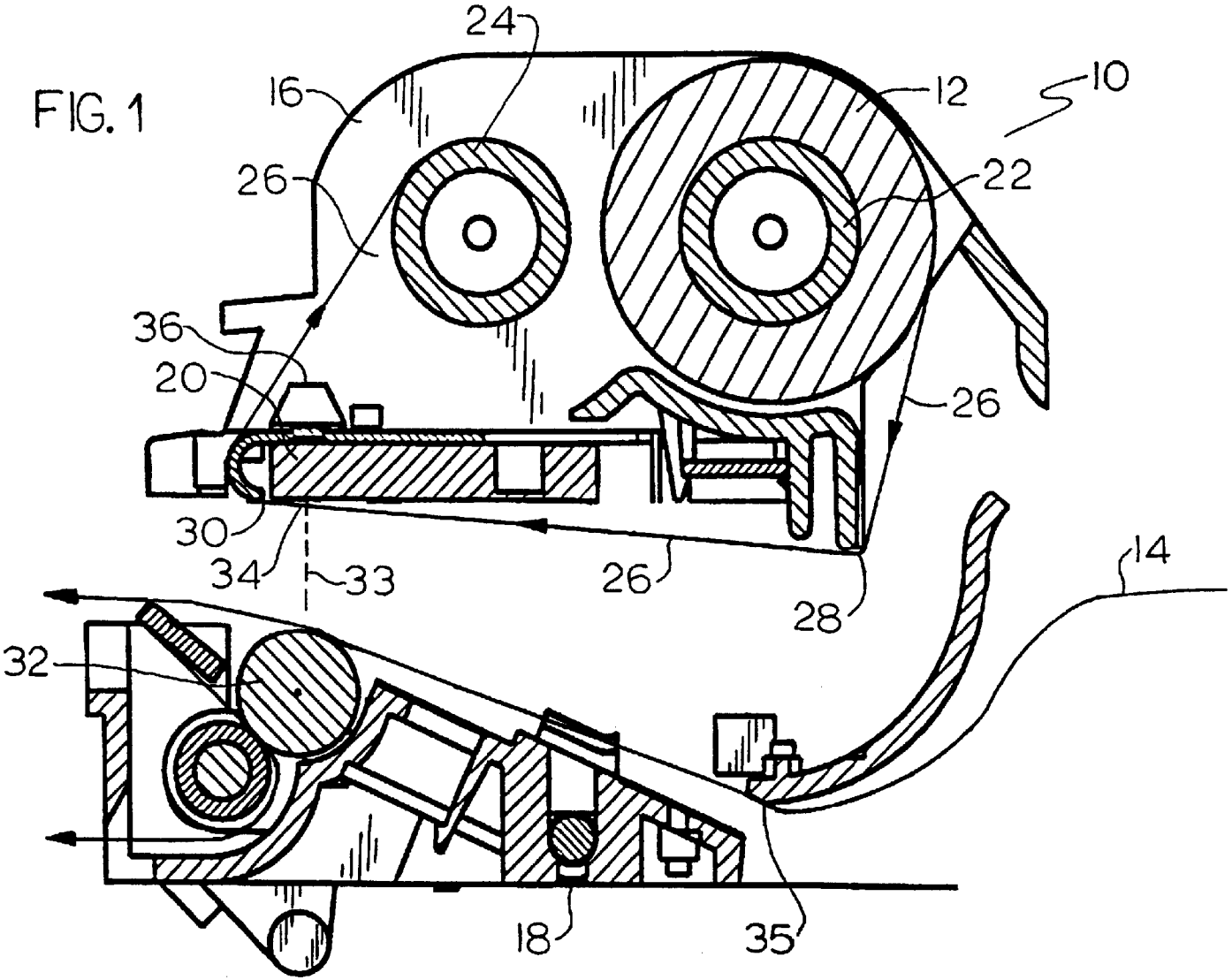
FIG. 1 is a schematic diagram of a preferred printer showing displaced drive and ribbon subassemblies to better illustrate the ribbon and paper paths.

FIG. 1 shows a schematic representation of a preferred printer apparatus 10 having its components displaced to facilitate showing the location and paths of a ribbon 12 and a print medium 14. The printer apparatus 10 is primarily comprised of a ribbon subassembly 16 and a drive subassembly 18. The ribbon subassembly 16 is primarily comprised of a print head 20 which generates an image to be printed under control of a computer (not shown) and a ribbon supply apparatus which moves the ribbon 12 used by the print head 20 to deposit ink onto the print medium 14. The ribbon supply apparatus is primarily comprised of a ribbon supply reel 22 and a ribbon takeup reel 24 with the ribbon 12 extending between. The ribbon 12 follows path 26 from the ribbon supply reel 22, a first ribbon guide 28, the print head 20, a second ribbon guide 20 and finally to the ribbon takeup reel 24.

The drive subassembly 18 is primarily comprised of a structure (described below) that provides a continuous print medium 14, e.g., paper or label stock, for receiving ink from the ribbon 12, and a drive roller 32 for moving the print medium 14 and the ribbon 12. The drive roller 32 preferably functions as both a drive mechanism for moving the print medium 14 and the ribbon 12 and as a platen, i.e., a print surface, for supporting the back of the print medium 14 during printing. In operation, the ribbon subassembly 16 and the drive subassembly 18 are brought together at a print point 33 which corresponds to a thermal pattern generator 34 on the print head 20 and the drive roller 32 which are only separated by the ribbon 12 and the print medium 14 passing between. At the print point 33, the paths of the ribbon 12 and the print medium 14 and the thermal pattern generator 34 at the lower surface of the print head 20 are all essentially tangential to the drive roller 32.

During the printing process, the drive roller 32 normally turns in a counter-clockwise direction moving the ribbon 12 and the print medium 14 together in a forward direction (right to left). As images are printed, a current portion of the ribbon 12 is partially used. This forward ribbon movement preferably replaces ribbon at the print point 33 with an unused ribbon portion from the ribbon supply reel 22. Since, the diameter of both the supply and takeup reels 22, 24 continuously change as the ribbon 12 is moved between the reels, the rotational speeds of the reels cannot directly correspond to the rotation of the drive roller 32. Instead, embodiments of the present invention preferably accumulate torque in a first direction (clockwise) in the takeup reel 24 to cause it to wind up ribbon independent of the rotation of the drive roller 32. Additionally, an opposing resistant torque (counter-clockwise) is accumulated in the supply reel 22 such that the ribbon 12 is tensioned at the print point 33.

A preferred embodiment for generating torque to the reels 22, 24 of the printer apparatus 10 is also applicable when label stock, i.e., removable labels on a continuous backing, is used as the print medium 14. Using structure described further below, labels can be removed from the backing following printing. Following the printing of each label (described further below), the label stock is further extended around a stripper bar which partially peels each printed label from the backing. The printing operation is then stopped to permit an operator to remove the partially peeled label. The printer apparatus 10 then proceeds with a short reverse movement to retrieve unused portions of the label stock. During this reverse movement (left to right), the supply reel 22 must retract the ribbon 12 and the takeup reel 24 must then resist this movement to keep the ribbon 12 tensioned and thus unwrinkled.

Figure 2:
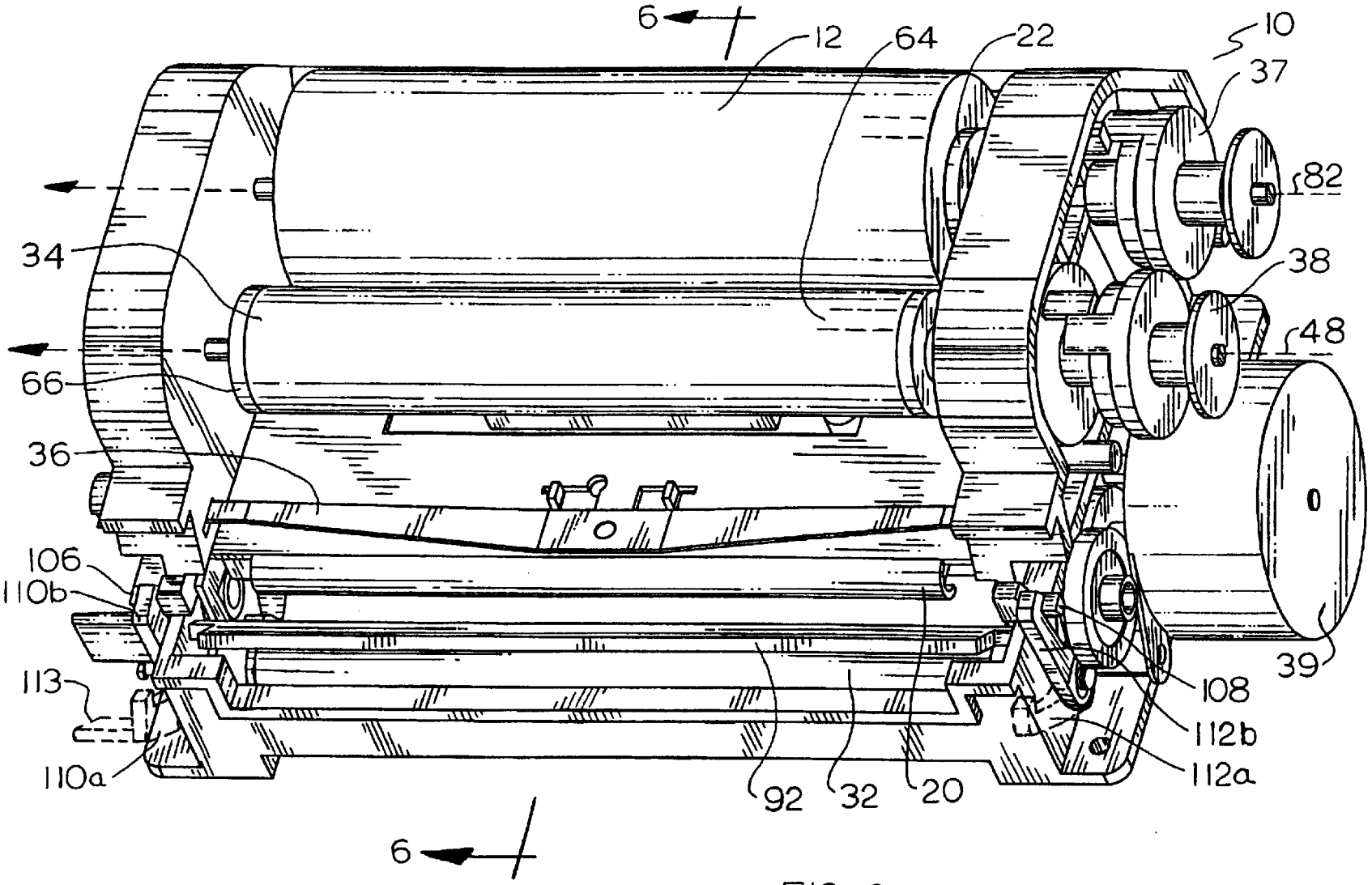
FIG. 2 is an isometric view of a preferred embodiment of the present invention.

FIG. 2 is an isometric view of the major components of the preferred printer apparatus 10 containing the ribbon tensioning apparatus of the present invention. The ribbon 12 extends from the ribbon supply reel 22 to the ribbon takeup reel 24 via the path 26 from the first ribbon guide 28 to the second ribbon guide 30 (see FIGS. 1, 6 and 7) that passes between the print head 20 and the drive roller 32 at the print point 33, essentially tangential to the drive roller 32. Additionally, the print medium 14, e.g., a label stock, extends between a print medium guide 35 and the second ribbon guide 30 such that the print medium is sandwiched between the ribbon 12 and the drive roller 32 at the print point 33. A compression member 36, e.g., a *leaf* spring, is elastically coupled to the print head 20 to maintain pressure between the print head 20 and the drive roller 32 as well as pinching the ribbon 12 and the print medium 14 sandwiched between.

To maintain an essentially constant tension on the ribbon 12 at the print point 33, a ribbon supply reel subassembly 37 is coupled to the ribbon supply reel 22 and torqued in a counter-clockwise direction. Additionally, a ribbon takeup reel subassembly 38 is coupled to the ribbon takeup reel 24 and torqued in a clockwise direction via a common driving means emanating from rotation of a common motor 39, preferably a stepper motor. In embodiments of the present invention, the common stepper motor 39 is preferably coupled to both the drive roller 32 and the ribbon takeup reel subassembly 38 such that a first, e.g., counter-clockwise, rotation of the stepper motor 39 causes counter-clockwise rotation of the drive roller 32 which moves the print medium 14 outward in an forward direction, i.e., right to left in FIG. 1. This same rotation of the stepper motor 39 is preferably also coupled to increase the clockwise torque of the ribbon takeup reel subassembly 38. Forward movement of the ribbon 12 then causes the ribbon supply reel subassembly 37 to be further torqued in a counter-clockwise direction in response to its clockwise rotation as the ribbon 12 is withdrawn.

Figure 3:
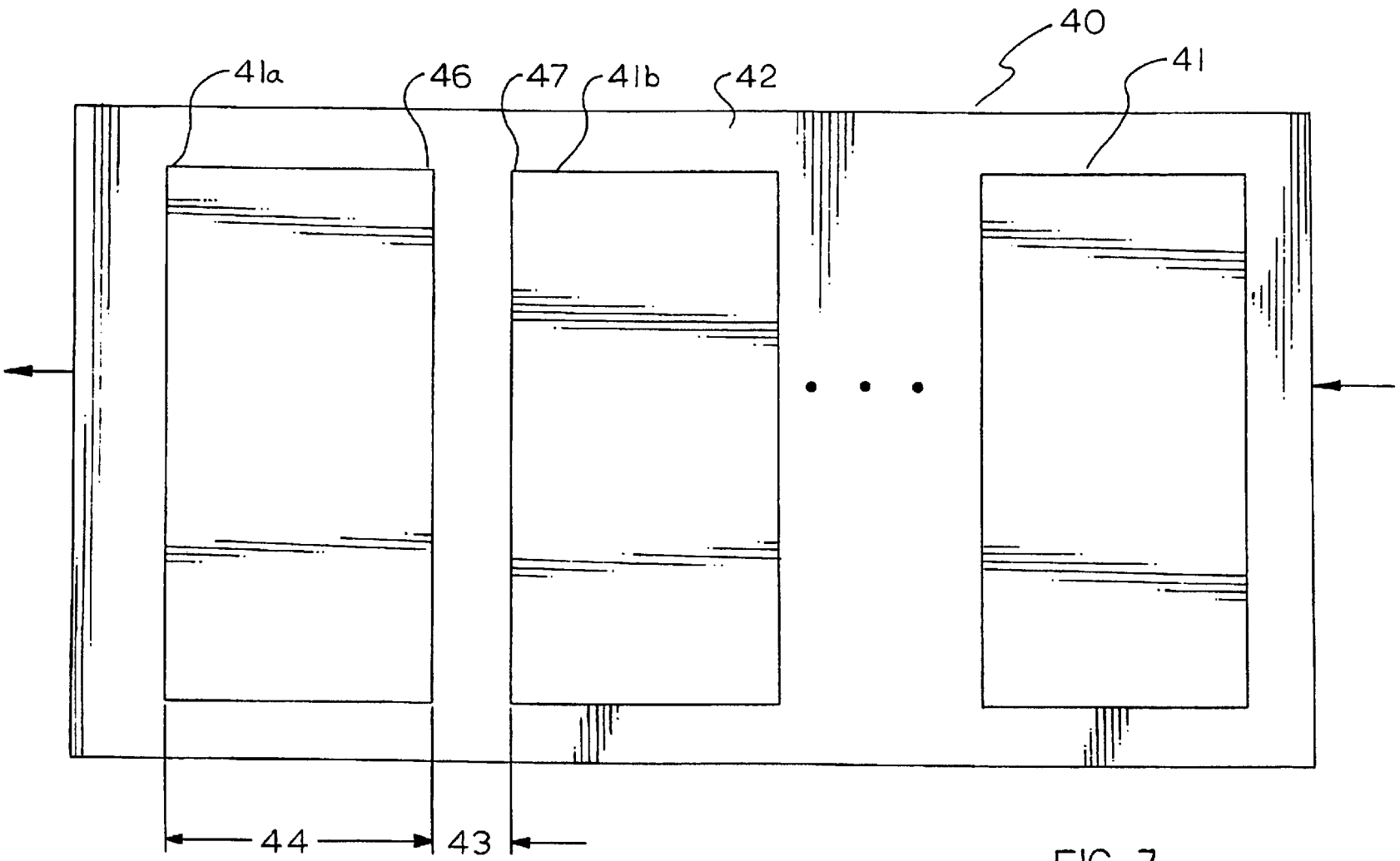
FIG. 3 is a plan view of a typical label stock used as a print medium for the present invention.

While it is generally desirable to maintain essentially constant tension on the ribbon 12, the advantages of this previously described structure, e.g., to enhance print quality, are of particular significance when the print medium is a label stock 40 as shown in FIG. 3. In the label stock 40, adhesive labels 41 are detachably mounted on a backing 42 with a short interlabel spacing 43, relative to the longitudinal size 44 of each label 41. When a single label 41a is printed, it cannot be removed from the backing 42 (as described further below) until the bottom 46 of the current label 41a is extended well beyond the print point 33. This positioning of the label stock 40 results in the print point 33 then being within a next label 41b, potentially wasting the next label 41b. To avoid wasting the next label 41b, a controller (not shown), e.g., a microcomputer within the printer 10, begins each label print operation by first reversing the rotation of the stepper motor 39 and accordingly the drive roller 32 until the beginning 47 of the next label 41b (now the current label) has been moved back to the print point 33.

The reverse rotation of the stepper motor 39 is additionally coupled in a counter-clockwise direction to the ribbon takeup reel subassembly 38 through a set of gears (discussed further below) and tends to release torque from the ribbon takeup reel subassembly 38. The torquing mechanism of the ribbon takeup reel subassembly 38 is configured to accumulate torque while each label 41 is being printed, i.e., when the ribbon takeup reel 24 is rotated in a clockwise direction as viewed in FIG. 1. Although a limited amount of torque is released when the movement of the label stock 40 is reversed, a net amount of torque remains in the ribbon takeup reel subassembly 38 due to the dimensional difference between the longitudinal size 44 of each label 41 and the interlabel spacing 43. (For example, in an exemplary label the longitudinal size 44 of each label is approximately forty times the interlabel spacing 43.)

The purpose of the ribbon takeup reel subassembly 38 is to maintain ribbon tension between the ribbon takeup reel 24 and the print head 20 in the forward direction (right to left in FIG. 1) by providing a clockwise torque. For a given forward print medium speed, the angular rotation of the ribbon takeup reel 24 will vary as the diameter of the ribbon takeup reel 24 changes. Additionally, the ribbon tension needs to be maintained during the previously described small reverse movement of the label stock 40. Therefore, embodiments of the present invention preferably include the capabilities to: 1) apply an essentially constant torque to the ribbon takeup reel 24 independent of its rotational speed (since this changes as the ribbon 12 is transferred from the supply to the takeup reel) and 2) accumulate torque to maintain a clockwise torque even during the short reverse label stock movement.

Figure 4:
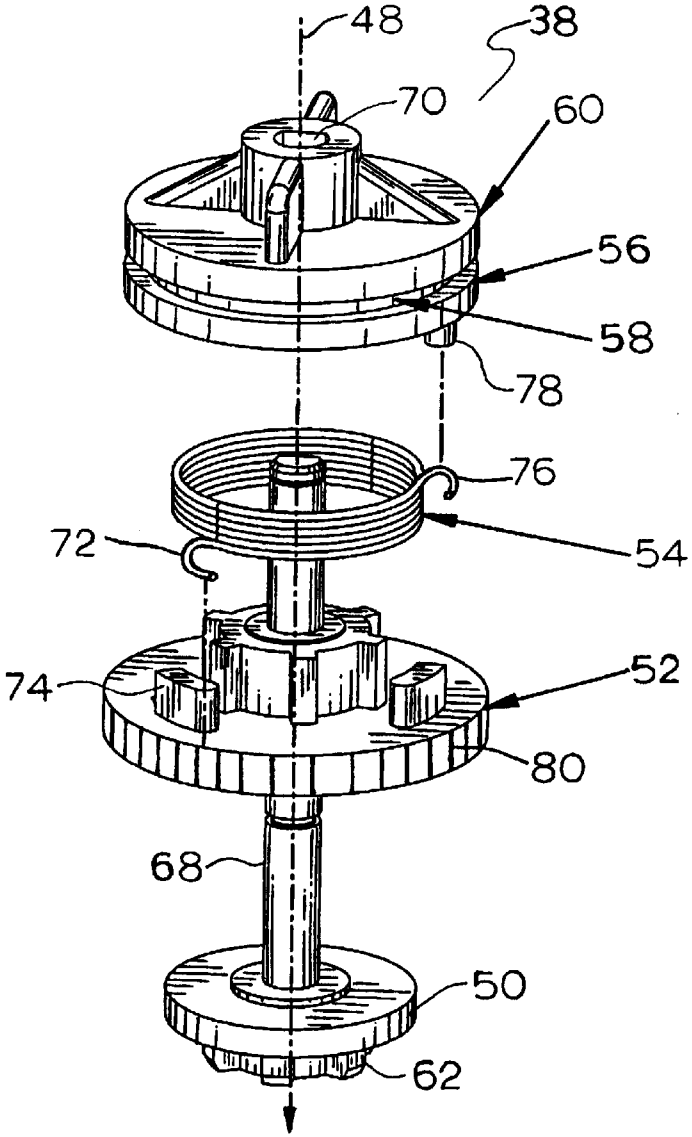
FIG. 4 is an exploded view of the ribbon takeup reel assembly along its rotational axis.

FIG. 4 shows a view of a preferred ribbon takeup reel subassembly 38, exploded along its rotational axis 48, which includes these capabilities. The ribbon takeup reel subassembly 38 is primarily comprised of a takeup hub mating plate 50, a spring mating hub 52, a torque spring 54, a clutch disk 56, a clutch pad 58 and a clutch hub 60. The takeup hub mating plate 50 preferably has an outer toothed surface 62 that is configured to capture reciprocally configured slots 64 (see FIG. 2) in the ribbon takeup reel 24. Preferably, the ribbon takeup reel 24 is tightly held against the outer toothed surface 62 of the takeup hub mating plate 50 as a consequence of a spring loaded hub 66 coupled to the opposing end of the ribbon takeup reel 24.

A first shaft 68 extends through the centers of the spring mating hub 52, the torque spring 54, the clutch disk 56, the clutch pad 58 and the clutch hub 60 where its outer end is fixedly mated to a centrally located slot 70 in the clutch hub 60. The torque spring 54 is coupled at a first end 72 to a first boss 74 on the spring mating hub 52 and at a second end 76 to a second boss 78 on the clutch disk 56. Consequently, torque can be accumulated in this assembly between the spring mating hub 52 and the clutch disk 56 within the torque spring 54.

Generally, torque is stored into this assembly from the stepper motor 39 via a set of gears (described further below) that is coupled to a toothed surface 80 on the spring mating hub 52. A clockwise rotation (as seen looking downward along rotational axis 48) imparts a clockwise rotational force to the clutch disk 56. However, an opposing frictional force is imparted via the clutch pad 58 to the clutch disk 56 from the clutch hub 60 and this frictional force will cause torque to be accumulated within the torque spring 54 as the clutch disk 56 resists rotation.

In a preferred embodiment, there is a limit to the amount of torque that can be accumulated within the torque spring 54 before excess energy is released. There are multiple manners in which this release occurs. Principally, the torque causes rotation of the clutch hub 60 and consequently the ribbon takeup reel 24 (since the clutch hub 60 is rigidly coupled via the shaft 68 to the takeup hub mating plate 50). The rotation of the takeup reel 24 is limited by the tension on the ribbon 12 which is opposed on the ribbon supply reel 22 by a similar torque storage structure located in the ribbon supply reel subassembly 37 (shown in FIG. 5). Alternatively, the accumulated energy can be released as frictional energy in the clutch pad 58 as the clutch pad 58 slips against the clutch disk 56.

As previously discussed, when the print medium 14 is label stock, the drive roller 32 and the spring mating hub 52 periodically reverse their normal rotations, respectively counter-clockwise and clockwise, to retrieve the label stock after facilitating removal of each printed label by an operator. Consequently, this counter-clockwise rotation of the spring mating hub 52 will also release a portion of the accumulated torque from the torque spring 54. However, this torque release will also be accompanied by a small reverse movement of the ribbon 12 due to clockwise rotation of the drive roller 32. Consequently, a small counter-clockwise rotation of the ribbon takeup reel 24 will occur as the ribbon 12 is withdrawn. This counter-clockwise rotation of the ribbon takeup reel 24 will cause identical rotations in the takeup hub mating plate 50 and the clutch hub 60 which tend to increase the torque in the torque spring 54. Therefore, the tension on the ribbon 12 and the torque on the ribbon supply reel subassembly 36 remain essentially constant during the forwards as well as the small reverse movements of the label stock 40.

The ribbon supply reel subassembly 37 preferably maintains ribbon tension between the ribbon supply reel 22 and the print head 20 during forward movement by providing a torque drag force. Additionally, ribbon tension is preferably maintained during the small reverse movement of the label stock. Therefore, embodiments of the present invention preferably include the capabilities to: 1) apply an essentially constant drag torque to the ribbon supply reel 22 and 2) accumulate torque.

Figure 5:
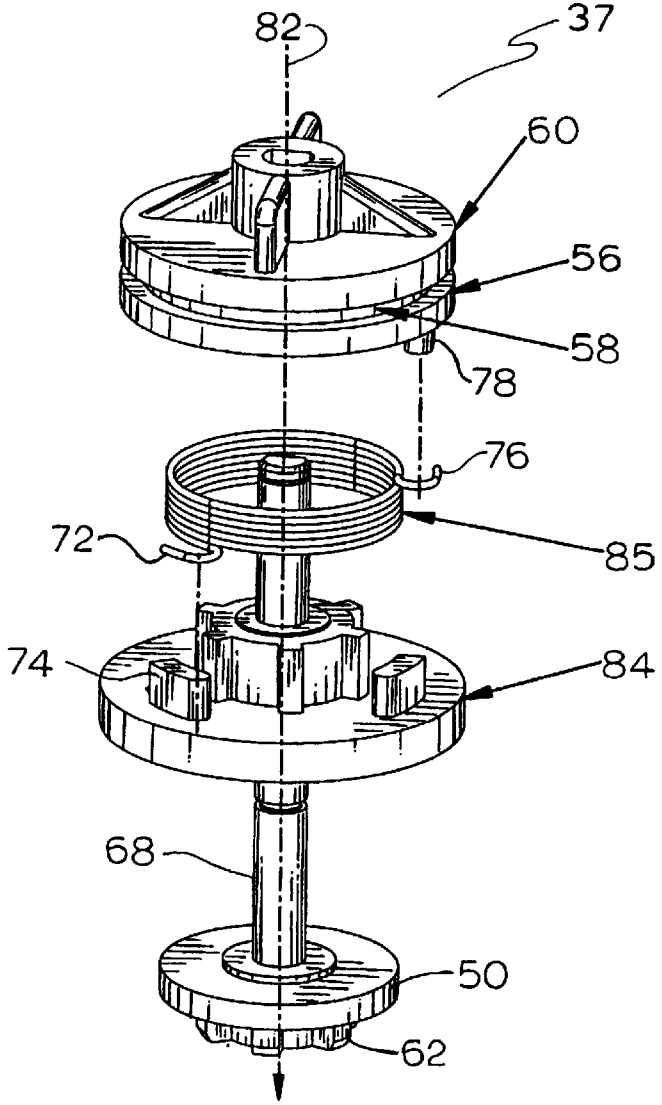
FIG. 5 is an exploded view of the ribbon supply reel assembly along its rotation axis.

FIG. 5 shows a view of a preferred ribbon supply reel subassembly 37, exploded along its rotation axis 82, that includes these capabilities. The structure of the ribbon supply subassembly 37 mirrors that of the ribbon takeup reel subassembly 38 with two notable exceptions. First, the spring mating hub 84 is rotationally fixed and second, the torque spring 85 is formed as a mirror image of the torque spring 54 so that the ribbon supply reel subassembly 37 can accumulate counter-clockwise torque. This torque is released when the ribbon supply reel 22 is permitted to turn in a counter-clockwise direction during the previously described reverse label stock movement. During the normal movement of the label stock 40, the ribbon 12 is withdrawn from the ribbon supply reel 22 causing torque to be accumulated in the torque spring 85 and thus presenting an opposing and essentially constant drag force on the ribbon 12.

Figure 6:
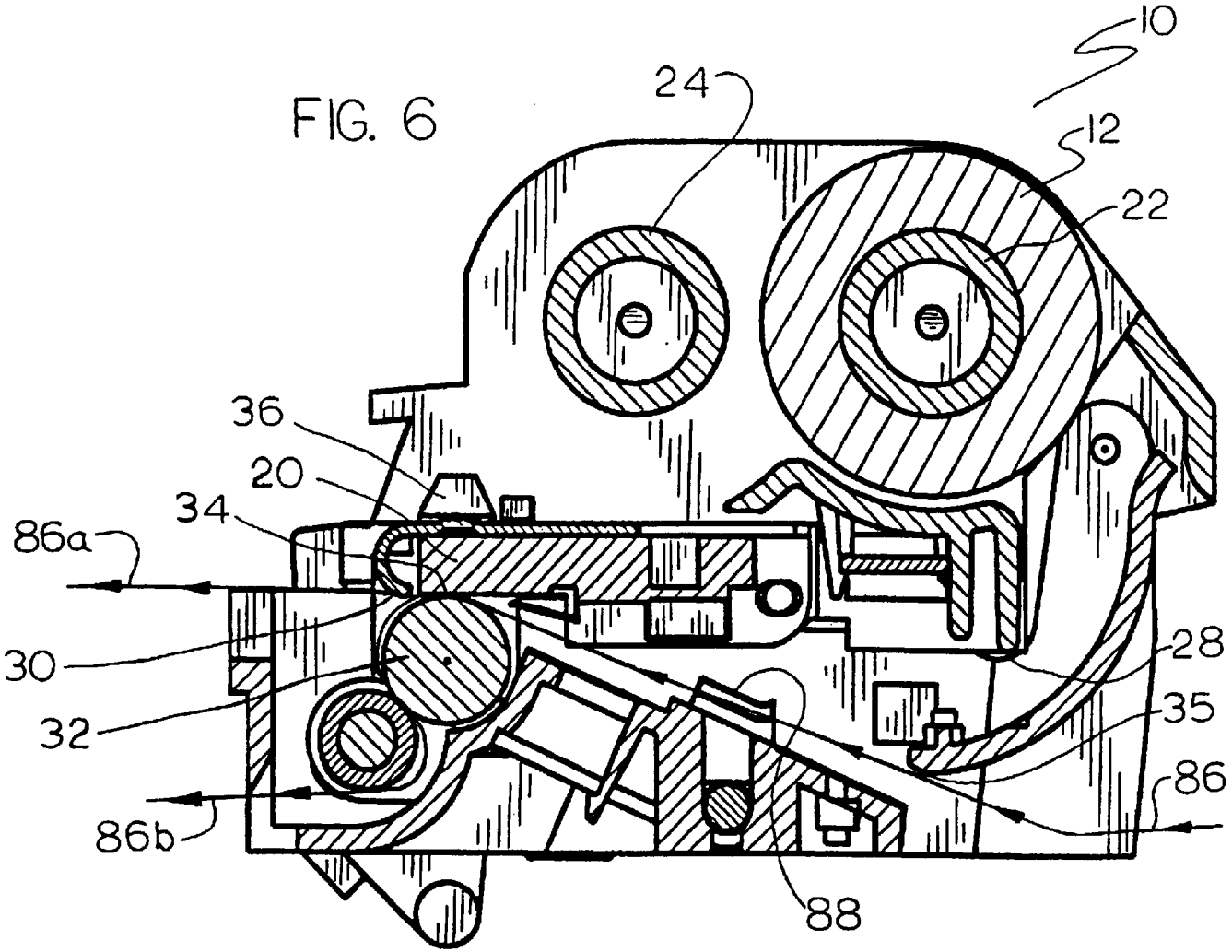
FIG. 6 is a sectional view taken substantially along the plane 6—6 of FIG. 2 which additionally shows the paper path when plain paper is used as the print medium.

As previously described, the embodiments of the present invention are useful when the print medium is plain paper as well as when the print medium is label stock 40. FIG. 6 shows a feed path 86 which is used when the print medium is plain paper. Plain paper is freely fed from a rear print medium cavity (not shown) past the print medium guide 35, a medium width adjustment mechanism 88, the print point 33, and then the paper essentially follows path 86a straight out of the printer 10. Alternatively, the plain paper may follow feed path 86b which additionally wraps the plain paper around the drive roller 32 and then between the drive roller 32 and a second roller 87, frictionally driven by the drive roller 32, before exiting the printer 10.

Figure 7:
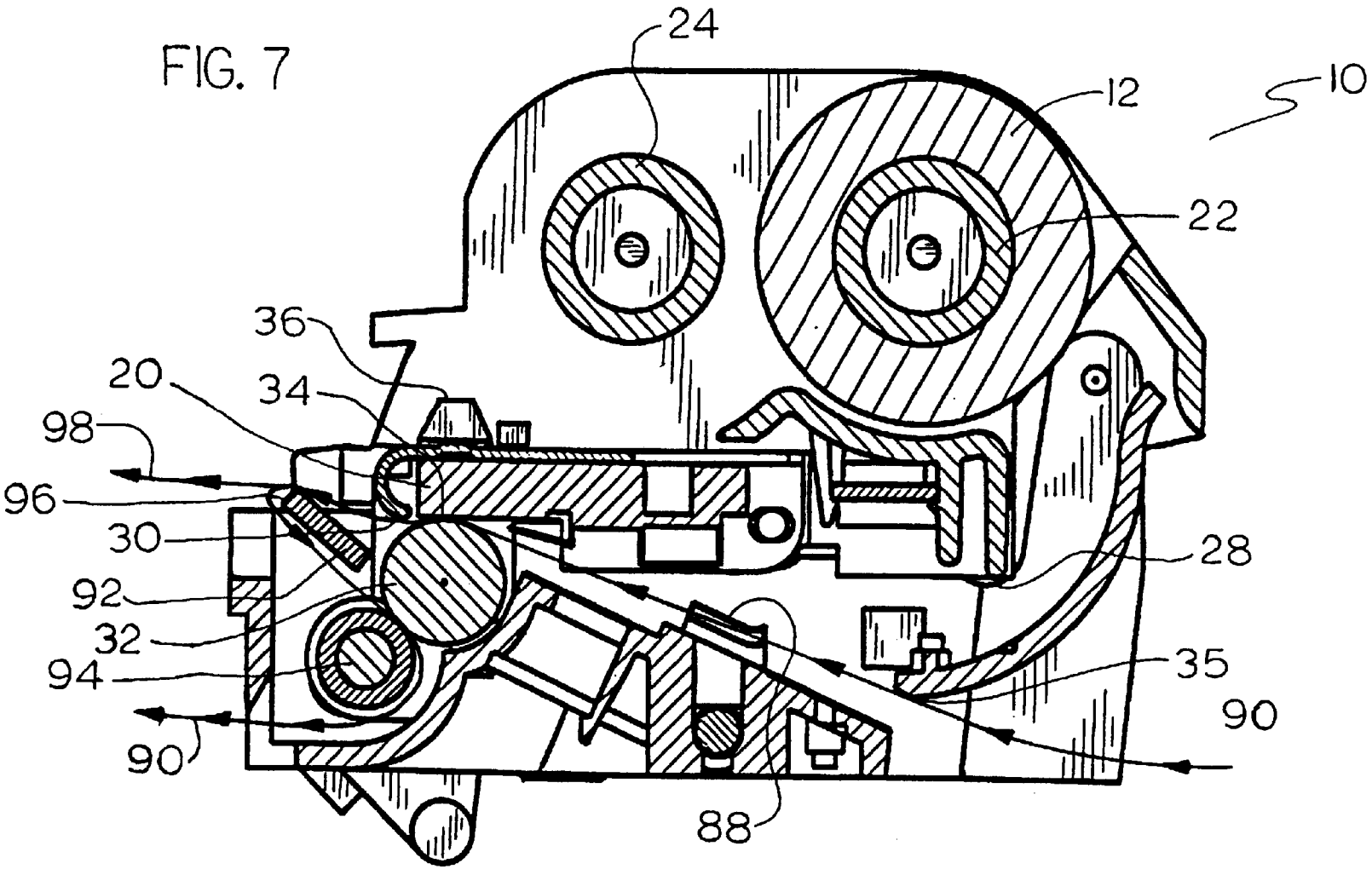
FIG. 7 is a sectional view taken substantially along the plane 6—6 of FIG. 2 which additionally shows the paper path when label stock is used as the print medium.

However, when label stock 40 is used as the print medium, a feed path 90, as shown in FIG. 7, is used. Additionally in the configuration of FIG. 7, a stripper bar 92 is added to the printer 10. Label stock 40 is freely fed from the rear print medium cavity (not shown) past the print medium guide 35, the medium width adjustment mechanism 88, the print point 33, the stripper bar 92 and then between the drive roller 32 and a stripper roller 94 before exiting the printer 10 along path 90. The stripper roller 94 is spring loaded against the drive roller 32 and is permitted to freely rotate in response to rotation of the drive roller 32. After a label 41a is printed, the label stock 40 moves around the stripper bar 92 before being drawn between the drive roller 32 and the stripper roller 94. Due to the magnitude of the path change at point 96, the label 41a is stripped away from the backing 42 and exits generally along path 98. The backing 42, now absent the label 41a, moves between the drive roller 32 and the stripper roller 94. After an operator removes the printed and now exposed label 41a, the printer 10 performs a small reverse movement to realign the next label 41b to the print point 33 as the next print operation begins.

Figure 8:
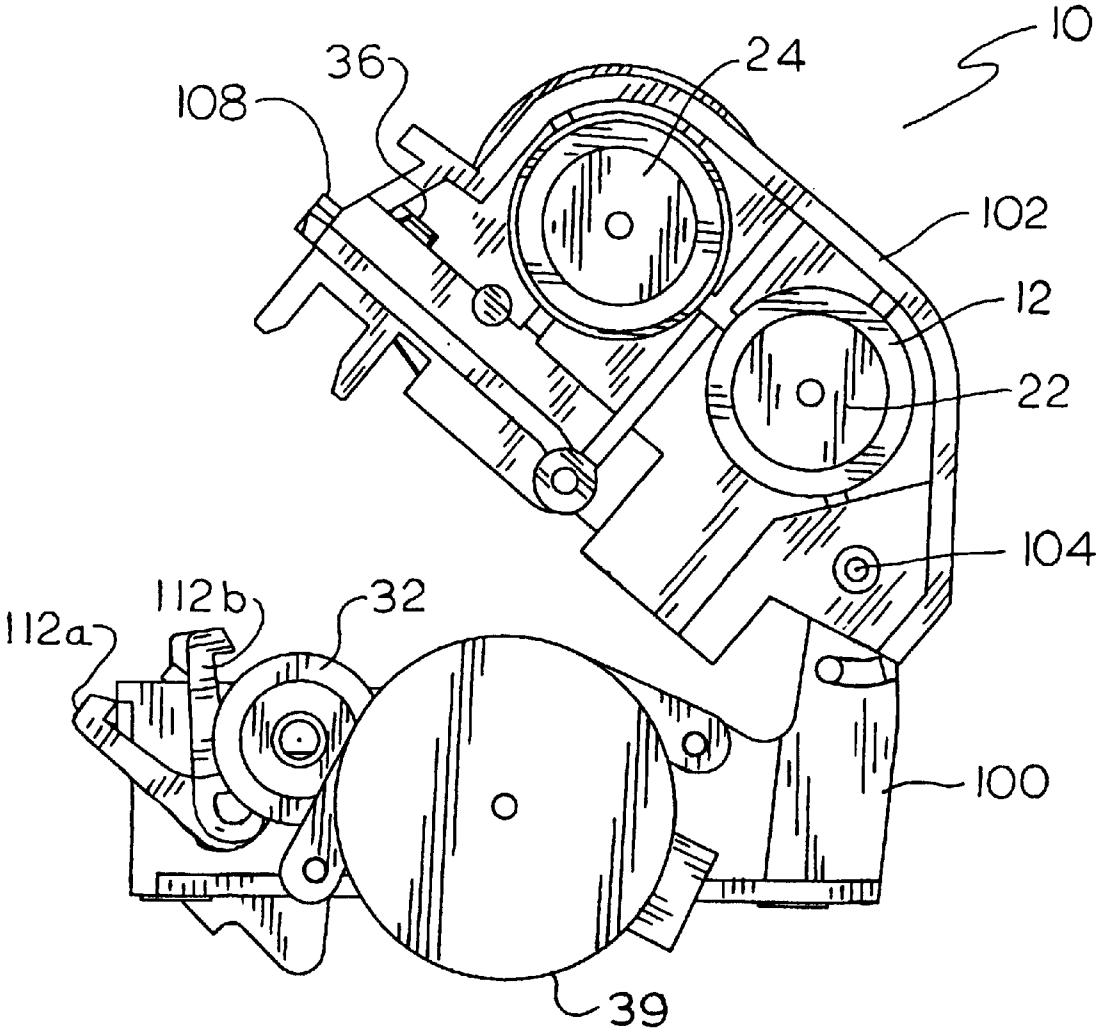
FIG. 8 shows a view of the ribbon subassembly rotated away from the drive subassembly to facilitate loading of the ribbon and the print medium.

Embodiments of the present invention preferably include a clam shell structure to ease loading of the ribbon 12 and the print medium 14. The printer 10, as shown in FIG. 8, preferably consists of two main assemblies: 1) a drive subassembly 100 which houses the stepper motor 39, its internal compound reduction gear, and the drive roller 32, and 2) a ribbon subassembly 102 which houses the ribbon reels 22, 24 and the print head 20. The ribbon subassembly 102 pivots along axis 104 on the drive subassembly 100 and can be swung away to facilitate threading of the ribbon 12 and the print medium 14. In its operating position (as shown in FIGS. 6 and 7), the ribbon subassembly 102 is latched to bosses 106, 108 on the drive subassembly 100 via two latches 110, 112, one on each side of the printer 10. A force, e.g., 8 pounds, generated by the compression member 36 on the print head 20 and drive roller 32 is distributed essentially equally between the latches 110, 112, e.g., 4 pounds/latch.

Figure 9:
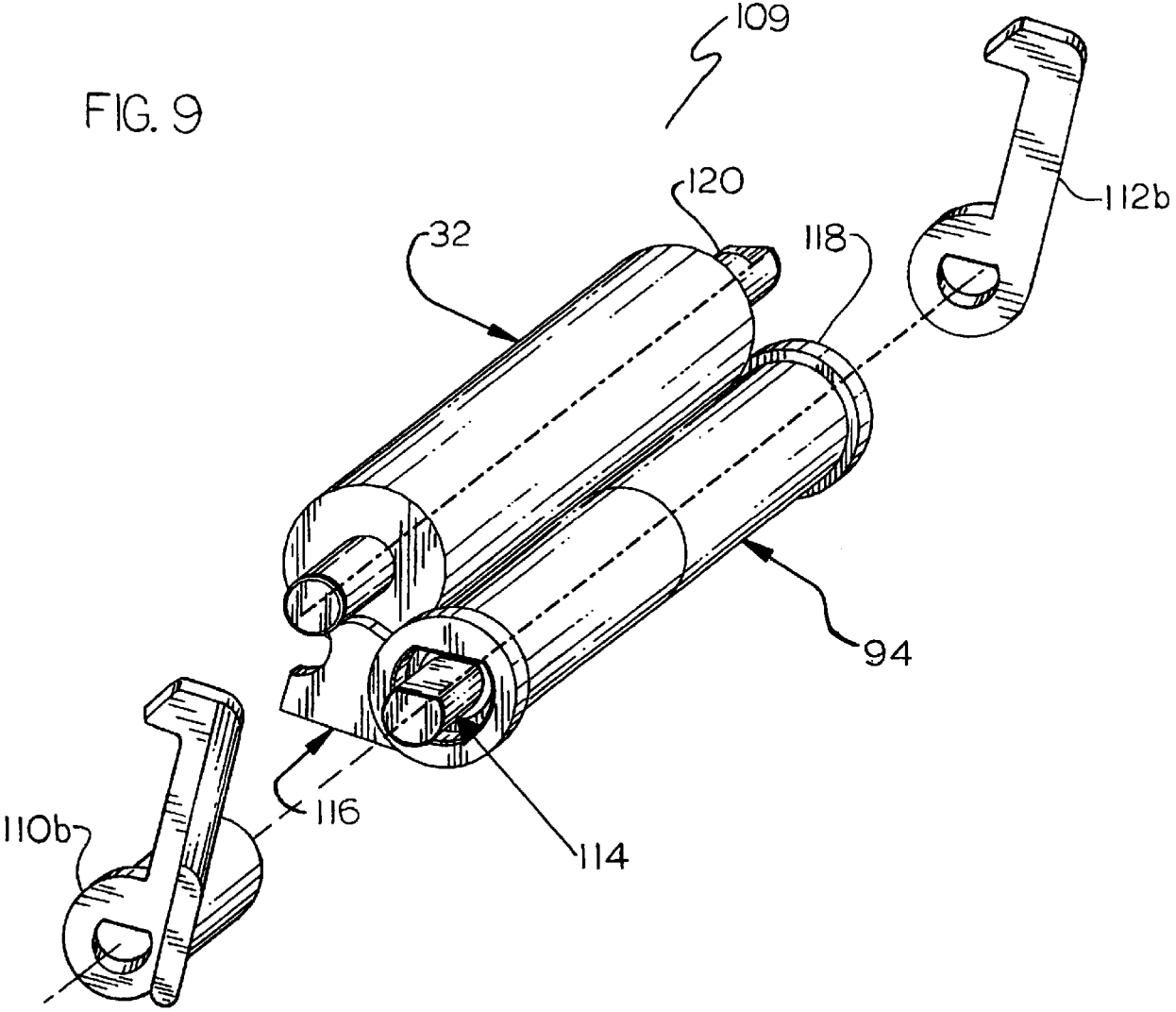
FIG. 9 is an exploded view of a preferred latching apparatus in its latched position.
Figure 10:
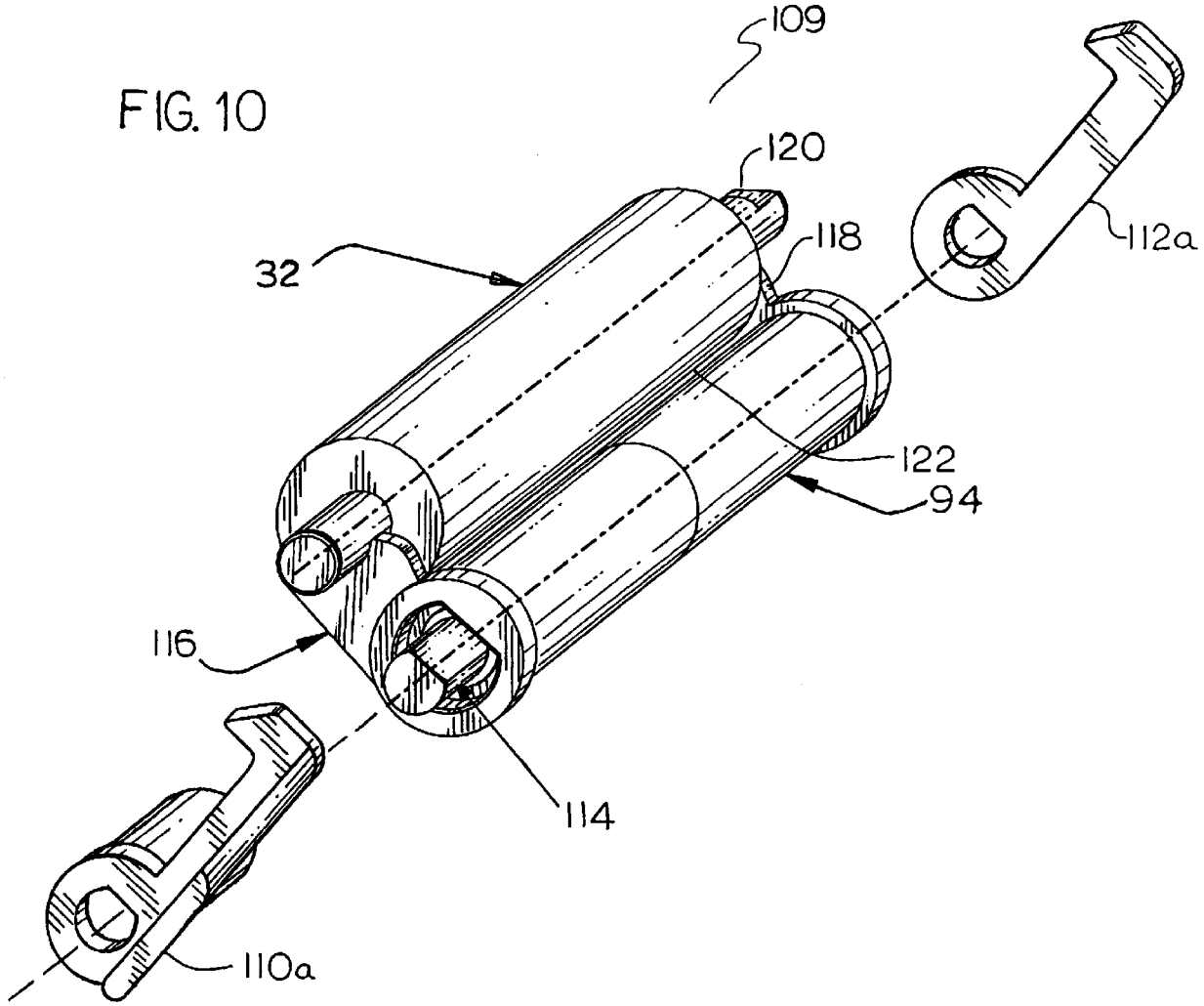
FIG. 10 is an exploded view of a preferred latching apparatus in its unlatched position of facilitate loading of the print medium.

Embodiments of the latching apparatus of the present invention preferably cooperatively couple the latches 110, 112 so that they can be activated by the action of a single lever 113 (as shown in FIG. 2). To facilitate loading of the label stock 40, a preferred latching apparatus additionally provides the capability of separating the stripper roller 94 from the drive roller 32 when the latches 110, 112 are unlatched from the bosses 106, 108. These capabilities are shown in FIGS. 9 and 10, exploded views of a portion of the latching apparatus 109. The latching apparatus 109 is primarily comprised of the two opposing latches 110, 112, rigidly coupled to a common shaft 114 which preferably functions as the axle for the stripper roller 94, a pair of opposing cams 116, 118, a drive axle 120 for the drive roller 32, and the pair of mating latch bosses 106, 108, integral to the ribbon subassembly 102.

In its latched position (shown in FIG. 9), the hooked ends of latches 110, 112 (rotated into positions 110b, 112b) cooperatively engage with latch bosses 106, 108 as the common shaft 14 is rotated, preferably using the common lever 113. In this position, the cams 116, 118 do not engage the drive axle 120 and thus the stripper roller 94 is pressed against the drive roller 32. However, in the unlatched position shown in FIG. 10, the latches 110, 112 (rotated into positions 110a, 112a) no longer engage the latch bosses 106, 108 and the cupped ends of cams 116, 118 cooperatively receive opposing ends of the drive axle 120 and push back the common shaft 114 and thus the stripper roller 94 from the drive roller 32. Consequently, a gap 122 is generated between the stripper roller 94 and the drive roller 32. Thus, when the latching apparatus 110 is in the position of FIG. 10, the ribbon subassembly 102 is free to rotate into the unlatched position shown in FIG. 8 where loading of the ribbon 12 is facilitated. The gap 122 also facilitates loading of the label stock 40 which can now be freely fed between the drive roller 32 and the stripper roller 94.

Figure 11:
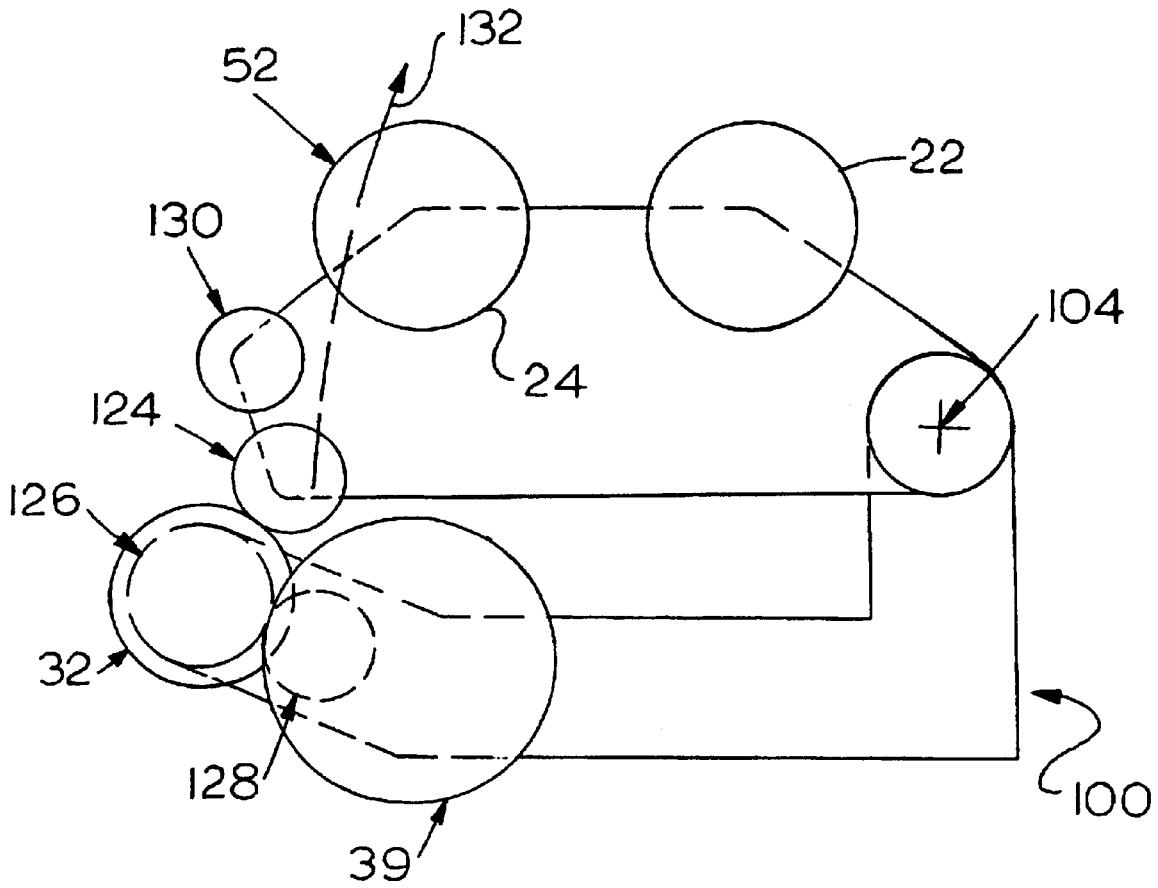
FIG. 11 schematically shows the gear drive train arrangement used to turn the drive roller and to maintain tension and wind the ribbon.

FIG. 11 schematically shows a preferred gear drive train arrangement used to turn the drive roller 32 and to maintain tension and wind the ribbon 12. When the ribbon subassembly 102 is in its operating position, idler 124 on the ribbon subassembly 102 meshes with a platen gear 126, integral to the drive axle 120. Rotation of the platen gear 126, via the stepper motor 39 and a compound reduction gear 128, results in rotation of idlers 124, 130 and thus rotation of the ribbon takeup reel 24 via the spring mating hub 52.

When the ribbon subassembly 102 is rotated to mate with the drive subassembly 100, idler 124 swings along arc 132 until the teeth of idler 124 contact the platen gear 126. The teeth of both gears are relatively pointed so that as the gears become engaged a flat tooth area does not prevent their meshing. Also the angle of approach provides a wiping action between the teeth of both gears. This wiping action not only helps engagement but causes idler 124 to rotate in a clockwise direction causing an initial amount of torque to be transferred into the ribbon takeup reel subassembly 38.

As previously described, the print medium is supplied from the print medium cavity behind the printer 10. The print medium is preferably comprised of either a roll of paper or label stock wound around a central hollow core. The central hollow core is mounted around a core axle 134 (shown in FIGS. 12A and 12B, respectively side and top views) having a diameter chosen such that the central hollow core can freely rotate. The core axle 134 is comprised of first and second essentially rectangular, e.g., oval, ends 136, 138 and a central support section 140 having an upper concave arc. The hollow core is solely supported by this upper concave arced section 140 of the core axle 134. The lower arced section shown in FIG. 12A only reflects a manufacturing simplification and is not required for this invention. The first and second ends 136, 138 of the core axle are non-rotatably inserted into support slots 142, 144 within a print medium cavity 146. As the print medium, e.g., label stock, is withdrawn from the non-rotatable core axle 134, the central hollow core tends to automatically centrally orient itself within the central support section 140 due to its curvature. This structure is of particular use in maintaining alignment of the print medium 14 within the printer 10.

Although the present invention has been described in detail with reference only to the presently-preferred embodiments, those of ordinary skill in the art will appreciate that various modifications can be made without departing from the invention. Accordingly, the invention is defined by the following claims.

We claim:

1. A printer apparatus comprising:

a print head;

a ribbon supply reel and a ribbon takeup reel carrying a ribbon extending therebetween, said reels mounted for rotation parallel to one another to enable winding of said ribbon in a forward direction from said supply reel to said takeup reel and in a reverse direction from said takeup reel to said supply reel;

a ribbon guide structure for guiding said ribbon along a ribbon path between said supply reel and said takeup reel, said ribbon path extending past said print head;

a print medium guide structure for guiding a print medium along a print medium path extending past said print head;

a drive mechanism selectively operable to (1) move said ribbon and print medium in a forward direction and rotate said ribbon takeup reel to wind ribbon thereon and (2) move said ribbon and print medium in a reverse direction;

a first torque mechanism coupled to said ribbon takeup reel for storing torsional energy concurrent with said drive mechanism moving said ribbon in a forward direction, said stored torsional energy acting in a direction to resist ribbon movement in said reverse direction; and a second torque mechanism coupled to said ribbon supply reel for storing torsional energy concurrent with said ribbon moving in said forward direction, said stored torsional energy acting in a direction to pull said ribbon in said reverse direction; said second torque mechanism acting concurrent with said drive mechanism moving said ribbon in said reverse direction to wind said ribbon onto said supply reel.

2. The printer apparatus of claim 1, wherein said first torque mechanism comprises:

a first rotatable disk coupled to said drive mechanism;

a second rotatable disk;

a torque spring for storing torque between said first and second rotatable disks;

a third disk fixedly coupled to said ribbon takeup reel; and a clutch pad for frictionally coupling said second rotatable disk to said third disk.

3. The printer apparatus of claim 1 wherein said second torque storage means comprises:

a first rotatable disk;

a second rotatable disk;

a torque spring for storing torque between said first and second rotatable disks;

a third disk fixedly coupled to said ribbon supply reel; and a clutch pad for frictionally coupling said second rotatable disk to said third disk.

4. The printer apparatus of claim 1 wherein said drive mechanism comprises:

a drive roller mounted opposite to said print head for pinching ribbon and print medium therebetween; and a motor for selectively driving said drive roller in a forward or reverse direction.

5. The printer apparatus of claim 4 further comprising:

a stripper bar located downstream from said print head; and a stripper roller coupled to drive roller for moving said print medium past said stripper bar.

6. The printer apparatus of claim 5 wherein said drive roller and strip roller are mounted parallel to one another for movement between a closed position for pinching a print medium therebetween and a separated position for facilitating the loading of a print medium therebetween.

7. The printer apparatus of claim 6 further comprising:

a cam mechanism rotatable between a first position for orienting said drive roller and strip roller in said separated position and a second position for orienting said drive roller and strip roller in said closed position.

8. A printer apparatus comprising:

a print head;

a drive roller mounted adjacent to said print head for pinching web material therebetween;

a ribbon supply reel and a ribbon takeup reel carrying a ribbon extending therebetween, said reels mounted for rotation parallel to one another to enable winding of said ribbon in a forward direction from said supply reel to said takeup reel and in a reverse direction from said takeup reel to said supply reel;

a ribbon guide structure for guiding said ribbon along a ribbon path between said supply reel and said takeup reel, said ribbon path extending between said print head and said drive roller;

a print medium guide structure for guiding a print medium along a print medium path extending between said print head and said drive roller;

a motor selectively moveable in a first direction to (1) rotate said drive roller to move said ribbon and print medium in a forward direction and (2) rotate said ribbon takeup reel to wind ribbon moving in a forward direction thereon; said motor selectively moveable in a second direction to rotate said drive roller to move said ribbon and print medium in a reverse direction;

a first torque mechanism coupled to said ribbon takeup reel for storing torsional energy in response to motor movement in said first direction, said stored torsional energy acting in a direction to resist ribbon movement in said reverse direction; and a second torque mechanism coupled to said ribbon supply reel for storing torsional energy when said ribbon moves in said forward direction, said stored torsional energy acting in a direction to pull said ribbon in said reverse direction; said second torque mechanism acting to wind said ribbon onto said supply reel when said motor moves in said second direction.

9. The printer apparatus of claim 8 wherein said first torque mechanism comprises:

a first rotatable disk coupled to said drive motor;

a second rotatable disk;

a torque spring for storing torque between said first and second rotatable disks;

a third disk fixably coupled to said ribbon takeup reel; and a clutch pad for frictionally coupling said second rotatable disk to said third disk.

10. The printer apparatus of claim 8, wherein said second torque storage means comprises:

a first rotatable disk;

a second rotatable disk;

a torque spring for storing torque between said first and second rotatable disks;

a third disk fixedly coupled to said ribbon supply reel; and a clutch pad for frictionally coupling said second rotatable disk to said third disk.

*11. The printer apparatus of claim 1, wherein the supply reel is rotated only by the pulling force of the ribbon and by said stored torsional energy.*

*12. The printer apparatus of claim 1, wherein said drive mechanism comprises a single motor.*

*13. The printer apparatus of claim 1, further comprising a leaf spring elastically coupled to the print head to maintain pressure between the print head and the ribbon and the print medium.*

* * * * *